No. 678,078. Patented July 9, 1901.
J. P. WETHERILL.
APPARATUS FOR DESULFURIZING ORES OR OTHER SUBSTANCES.
(Application filed Nov. 6, 1897.)
(No Model.) 7 Sheets—Sheet 1.

No. 678,078. Patented July 9, 1901.
J. P. WETHERILL.
APPARATUS FOR DESULFURIZING ORES OR OTHER SUBSTANCES.
(Application filed Nov. 6, 1897.)
(No Model.) 7 Sheets—Sheet 2.

No. 678,078. Patented July 9, 1901.
J. P. WETHERILL.
APPARATUS FOR DESULFURIZING ORES OR OTHER SUBSTANCES.
(Application filed Nov. 6, 1897.)
(No Model.) 7 Sheets—Sheet 4.

Fig. 7.

No. 678,078. Patented July 9, 1901.
J. P. WETHERILL.
APPARATUS FOR DESULFURIZING ORES OR OTHER SUBSTANCES.
(Application filed Nov. 6, 1897.)
(No Model.) 7 Sheets—Sheet 5.

Witnesses
Inventor

No. 678,078. Patented July 9, 1901.
J. P. WETHERILL.
APPARATUS FOR DESULFURIZING ORES OR OTHER SUBSTANCES.
(Application filed Nov. 6, 1897.)
(No Model.) 7 Sheets—Sheet 6.

No. 678,078. Patented July 9, 1901.
J. P. WETHERILL.
APPARATUS FOR DESULFURIZING ORES OR OTHER SUBSTANCES.
(Application filed Nov. 6, 1897.)
(No Model.) 7 Sheets—Sheet 7.

Fig. 10.

Witnesses
F. H. Schott
Raymund Glotzner.

Inventor
J. Price Wetherill,
by Cennie & Goldsborough
Attorneys

UNITED STATES PATENT OFFICE.

JOHN PRICE WETHERILL, OF SOUTH BETHLEHEM, PENNSYLVANIA.

APPARATUS FOR DESULFURIZING ORES OR OTHER SUBSTANCES.

SPECIFICATION forming part of Letters Patent No. 678,078, dated July 9, 1901.

Application filed November 6, 1897. Serial No. 657,610. (No model.)

*To all whom it may concern:*

Be it known that I, JOHN PRICE WETHERILL, a citizen of the United States, residing at South Bethlehem, in the county of Northampton and State of Pennsylvania, have invented certain new and useful Improvements in Apparatus for Desulfurizing Ores or other Substances; and I do hereby declare the following to be a full, clear, and exact description of the invention, such as will enable others skilled in the art to which it appertains to make and use the same.

My invention relates to the desulfurizing of ores and other minerals, and more particularly to improvements which, while generally applicable to the desulfurization of ores, minerals, or other substances containing sulfur, are especially adapted for the rapid and economical desulfurization of ores (such as zinc-blende and the like) which retain their sulfur with comparative tenacity and which have heretofore required very considerable expenditure of time and fuel for their successful treatment.

Prior to my present invention it has been customary in modern furnaces having automatic stirrers or rabbles for the roasting of ores containing sulfur to permit the products of combustion from the gas-furnaces or other heating-furnaces to pass directly into the tunnel or hearth upon which the ore undergoing treatment rests and to convey said products of combustion, together with the sulfur fumes incident to the operation, into the open air by means of the usual chimney-stack. In this practice the sulfur is not recovered and goes to waste. The proper oxidation of the sulfur is delayed by the presence of the large quantity of carbonic-acid gas present in the products of combustion within the roasting tunnel or chamber and by the presence of the sulfur fumes themselves, which, developed in greater volume at the point of entrance of the ore into the tunnel, pass on over the entire body of ore contained therein before finding their exit at the flue leading to the chimney-stack. As a consequence of these and other conditions the roasting of zinc-blende in even the best of the modern roasting-furnaces has been prior to my invention a time-consuming and expensive operation. With the purpose of materially shortening the period of roasting these and like ores, and thereby obtaining a larger or increased output of roasted ore and securing a corresponding economy in the amount of fuel and labor incident to such roasting I have devised the improvements hereinafter described.

The main characteristic features of my invention consist in excluding from the roasting-chamber proper the products of combustion of the gas-furnaces or other heating-furnaces and supplying to the roasting-chamber at suitable intervals throughout its length the necessary quantities of air at suitable temperatures for the proper oxidation of the sulfur, utilizing the heat of the burning sulfur itself to assist in maintaining the proper roasting temperature throughout a suitable length of the furnace-chamber, withdrawing the sulfur fumes at the point where they are disengaged with sufficient richness to enable them to be economically condensed and recovered, and thereby interrupting their continued progress over the ore nearer the exit end of the chamber, regulating the degree of heat in each successive section of the roasting-chamber in accordance with the particular requirements of each of such sections, heating the roasting-chamber from below and from the top by means of flues separately controllable, and employing the waste products of combustion for the purpose of preheating the incoming air employed in the apparatus.

My invention further consists in certain details of construction, particularly the construction of the floor of the roasting-chamber, in connection with its supporting-arches, whereby substantial uniformity of heating-surface is obtained across the entire width of such floor, as will be hereinafter more particularly described and claimed.

In the accompanying drawings.

Similar letters of reference indicate similar parts throughout the several views.

Referring to the drawings, A indicates the roasting-chamber proper, and consists of a continuous tunnel extending from one end to the other of the structure and provided at its inlet end with weighted flap-doors $a$ $a$ and at its exit end with similar doors $b$ $b$. The roasting-chamber is provided with a vaulted roof $c$, as shown, and its floor consists of a series of tiles of refractory material $d$, said tiles being rabbeted, as shown, and being supported by subjacent arches $e$. These arches $e$ are placed at short distances apart, thereby leaving a free intervening space to which the products of combustion from the gas or roasting furnaces have full access, these intervals being spanned by the tiles. As a consequence of this construction the floor of the roasting-chamber is subjected across its entire width to substantially the same heating effect, which would not be the case were the floor supported by a single continuous arch. By reason of this improved floor construction the ore is heated to substantially the same temperature across the entire width of the roasting-chamber, and therefore the product obtained is of correspondingly uniform quality, the roasting process itself proceeding uniformly across the entire body of ore. It is therefore not necessary to detain in the furnace any portion of ore to await the completed roasting of the remaining portions near the sustaining-walls of the arches, as has heretofore been found essential, and a corresponding gain in time, as well as in uniformity of product, is obtained. It will be observed that each course of floor-tiles rests upon shoulders of the supporting-arches and in such manner that the upper surface of the tiles is flush with the upper-surface portions of the arches, which project above the supporting-shoulders. By this expedient the roasting-chamber is provided with an entirely smooth floor, and each course of tiles is securely held against any possible longitudinal movement.

Beneath the arches $e$ extend combustion-chambers for the reception of products of combustion from the gas or other heating-furnaces employed, and above the vaulted roof $c$ of the roasting-chamber extend auxiliary combustion-chambers provided for the regulated admission of products of combustion from the same furnaces, so that the roasting-chamber, shut off entirely from access thereto of the products of combustion from the heating-furnaces, is heated externally at top and bottom, as will hereinafter more fully appear. The upper combustion-chamber is provided with a vaulted roof $f$, whose keystone $g$ is stepped within a body of refractory sand contained in a channel above the arch $c$, the purpose of this construction being that whatever expansion or contraction may take place in the arch $c$ the same will not be transmitted to the upper arch to weaken the latter and will be compensated for by the presence of the sand referred to.

The stirrers, which may be of any suitable character, may conveniently consist of blades set at an appropriate angle and attached to the shaft or axle of wheeled carriers B, said carriers being attached, as is well understood, to endless conveyer-chains C, passing over suitable guide and sprocket wheels and provided with the customary horns or projections for raising or lowering the flap-doors at the entrance and exit of the roasting-chamber. It will of course be understood that the tracks upon which the wheels of the carriers B travel are located entirely outside of the roasting-chamber and in the open air, and the shafts or axles of the carriers extend through lateral openings in the side walls of the roasting-chamber, said lateral openings being protected by a series of pivoted plates, which are successively raised by the passage of the carrier and successively resume their pendent position, so as to close the side openings as far as it is practicable so to do. The entrance of cold air into the furnace is thereby guarded against; and to the same end it is usually preferred to maintain such pressure within the roasting-chamber as will contribute further to the exclusion of any material quantity of cold air.

The roasting-chamber may be considered as consisting, first, of an initial portion within which the ore is supplied with heated air and whose external combustion-flues are maintained at a fairly high temperature in order to raise the ore to a dull-red heat rapidly and to thereby start the separation of the sulfur from the zinc; secondly, of an intermediate portion in which the heat evolved by the transition of the liberated sulfur into $SO_2$ serves to maintain the desired temperature without the necessity of further air-supply and without requiring as intense a combustion in the external combustion-flues, for which reason also the said intermediate portion may be of greater length than its predecessor with equal capacity in the gas producers or furnaces; thirdly, of one or more additional portions, wherein heated air is again admitted to further the combustion of the sulfur and wherein the external combustion-flues are brought to a high temperature because of the much less rapid rate at which the sulfur is separated. I prefer, indeed, to bring the final or exit portion of the roasting-chamber to the highest temperature available in order to accelerate the difficult separation of the last of the sulfur that is necessary to be separated; and to this end the portion of the roasting-chamber beyond the intermediate portion referred to may be considered as consisting of two subportions, each of which is independently heated by external combustion-chambers, the final subportion being of less length than its predecessor and being brought to the highest temperature employed in the apparatus.

Figure 1:
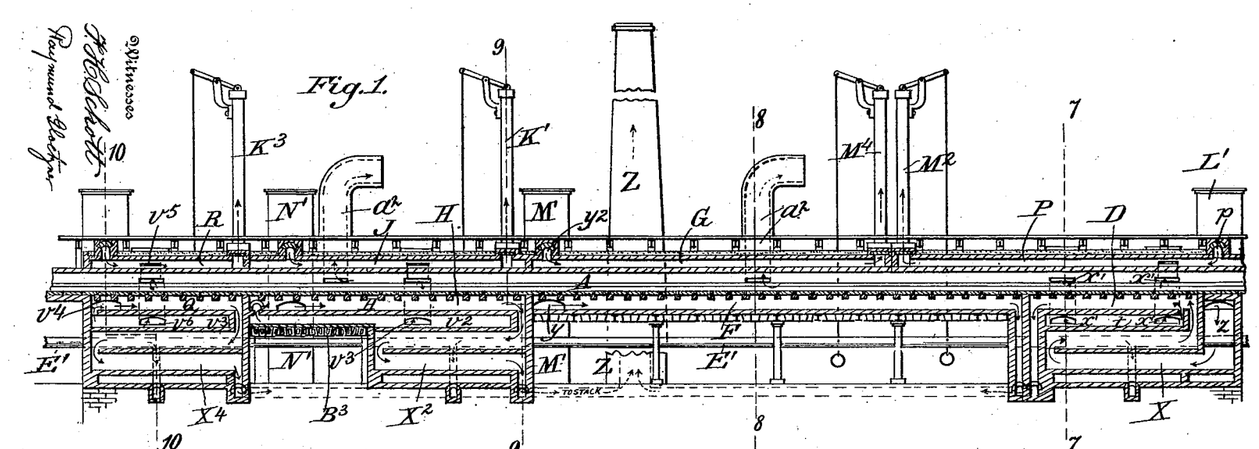
Figure 1 represents a longitudinal section of a roasting-furnace embodying my improvements.
Figure 2:
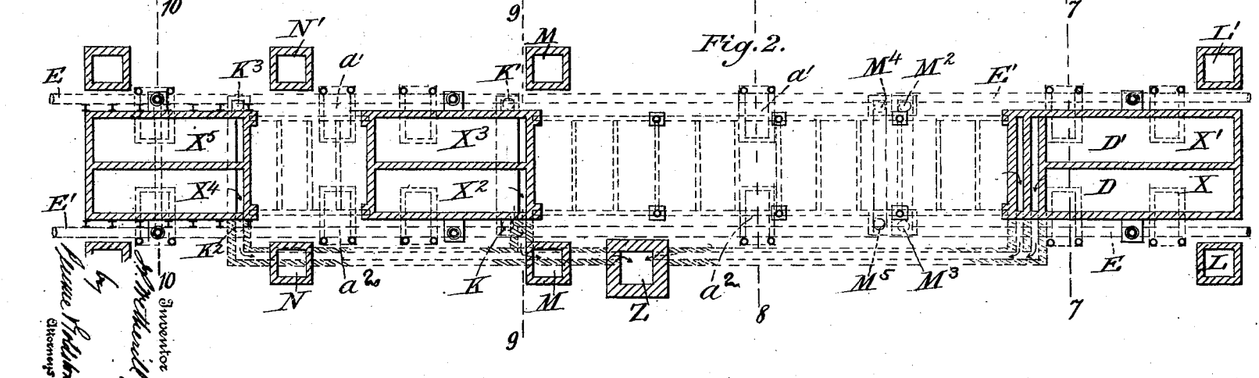
Fig. 2 represents a plan view thereof in section.
Figure 3:
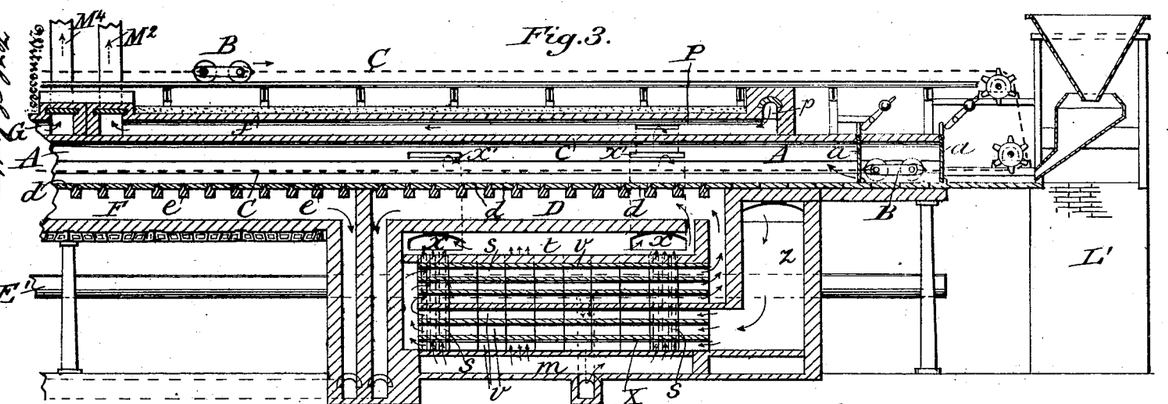
Fig. 3 represents in section, on a larger scale, the initial portion of the furnace, illustrating also the ore-feeding device therefor.
Figure 4:
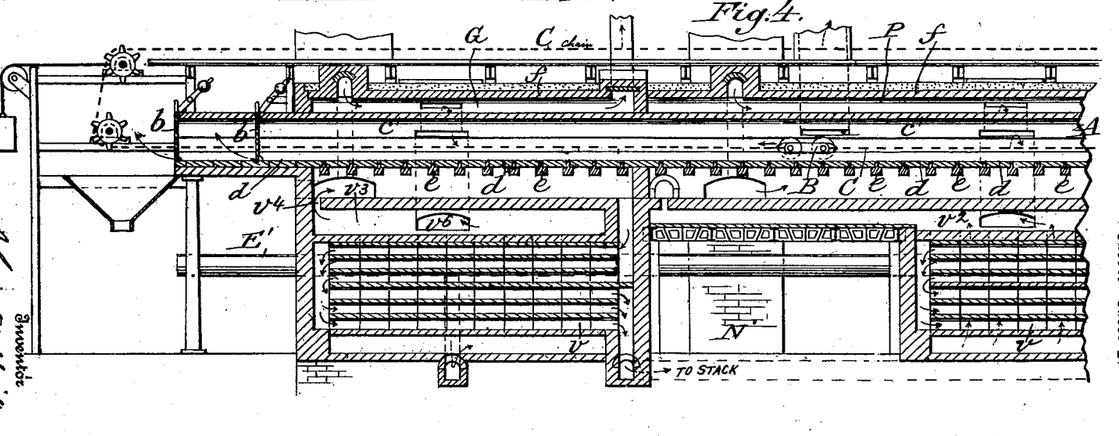
Fig. 4 represents a vertical section of the exit portion of the furnace and its adjuncts.
Figure 5:
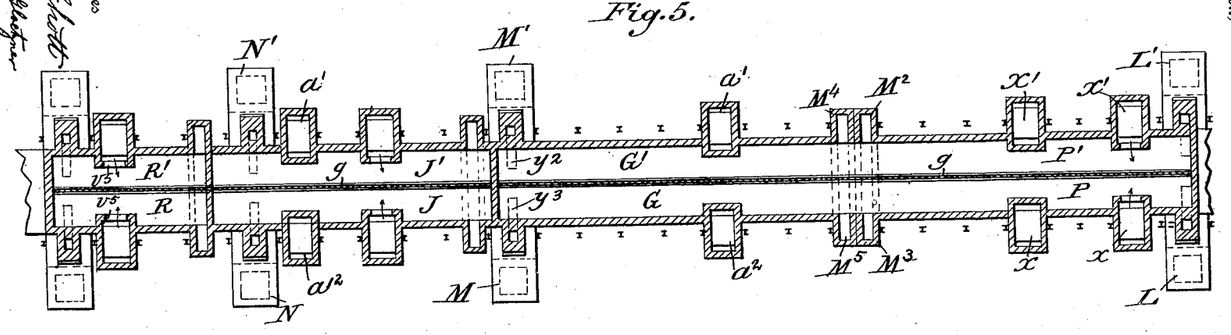
Fig. 5 represents a longitudinal horizontal section through the upper heating-chamber.
Figure 6:
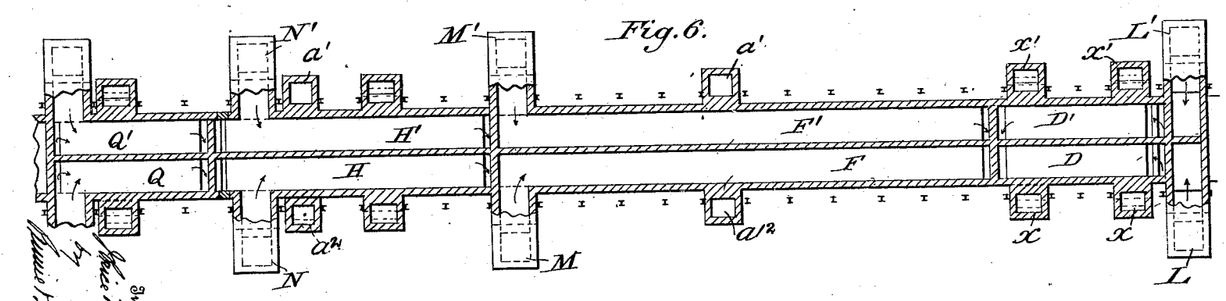
Fig. 6 represents a like section through the lower heating-chamber.
Figure 7:
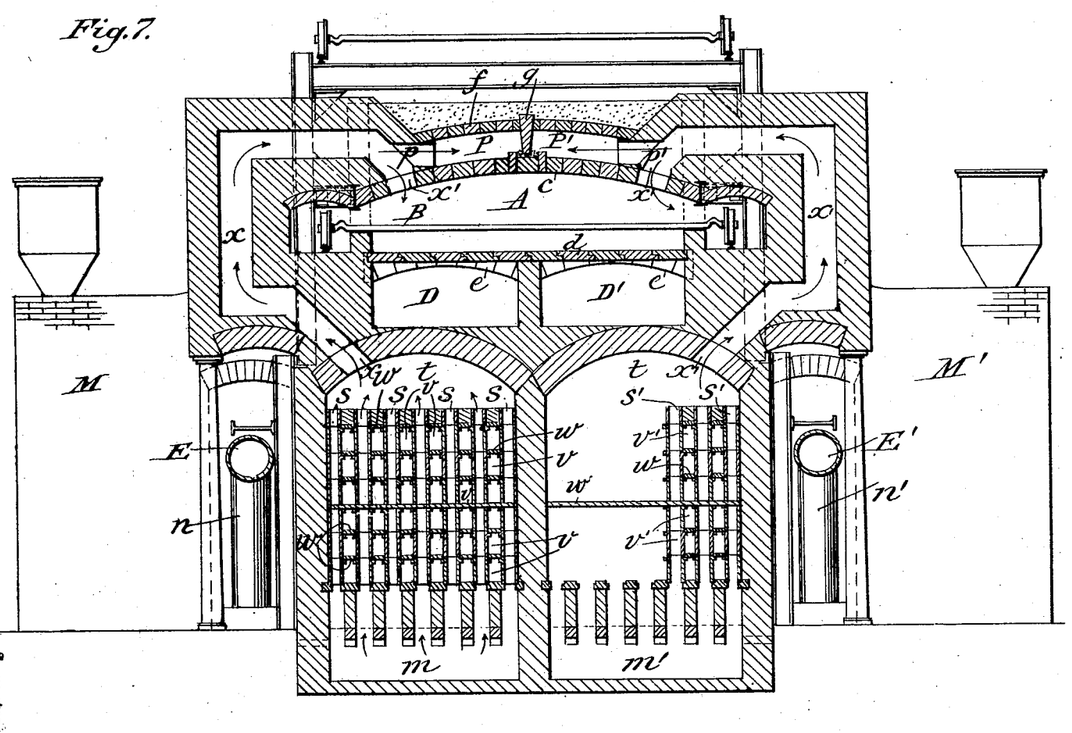
Fig. 7 represents a vertical section on the line 7 7 of Fig. 2.
Figure 8:
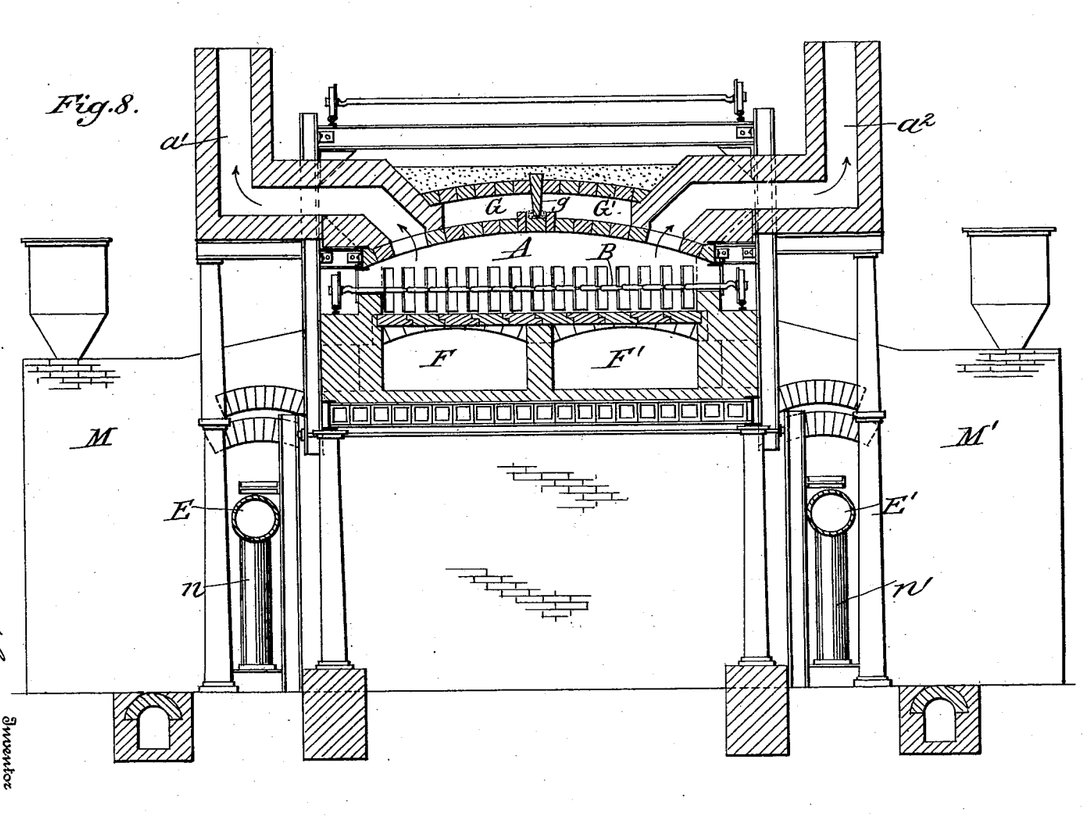
Fig. 8 represents a vertical section on the line 8 8 of Fig. 2.
Figure 9:
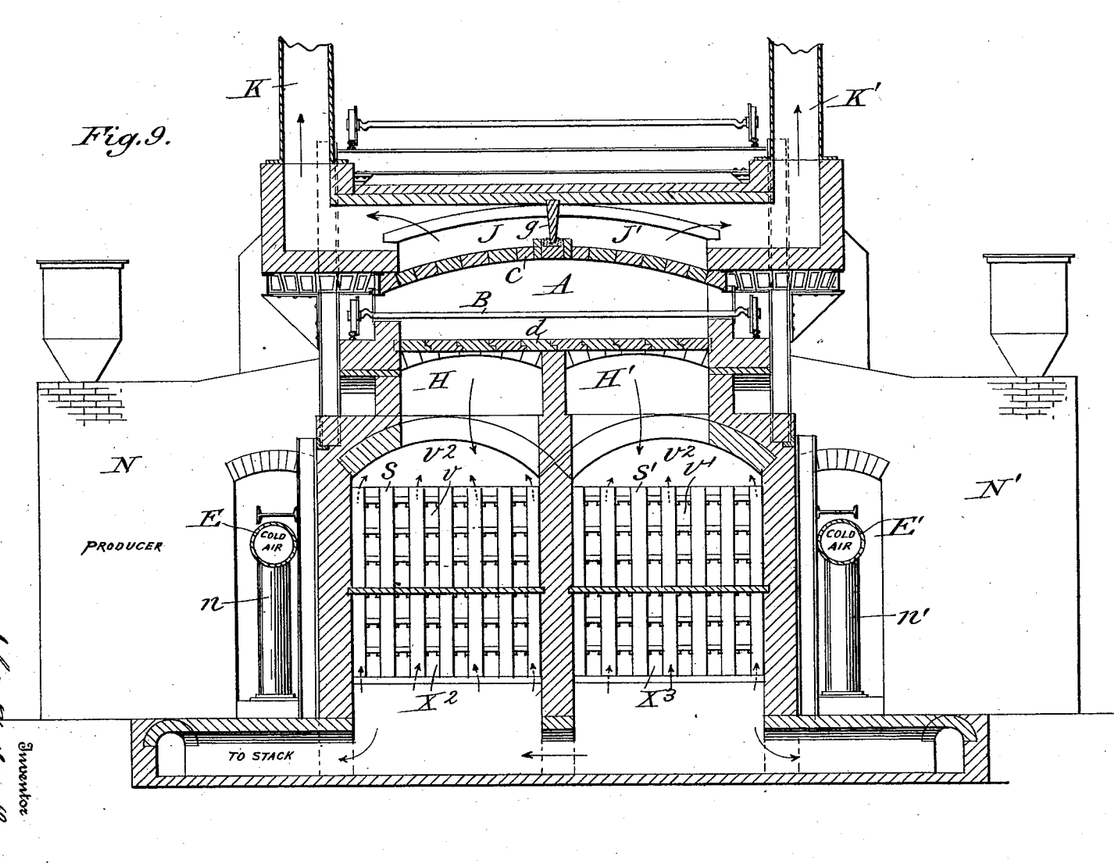
Fig. 9 represents a vertical section on the line 9 9 of Fig. 2.
Figure 10:
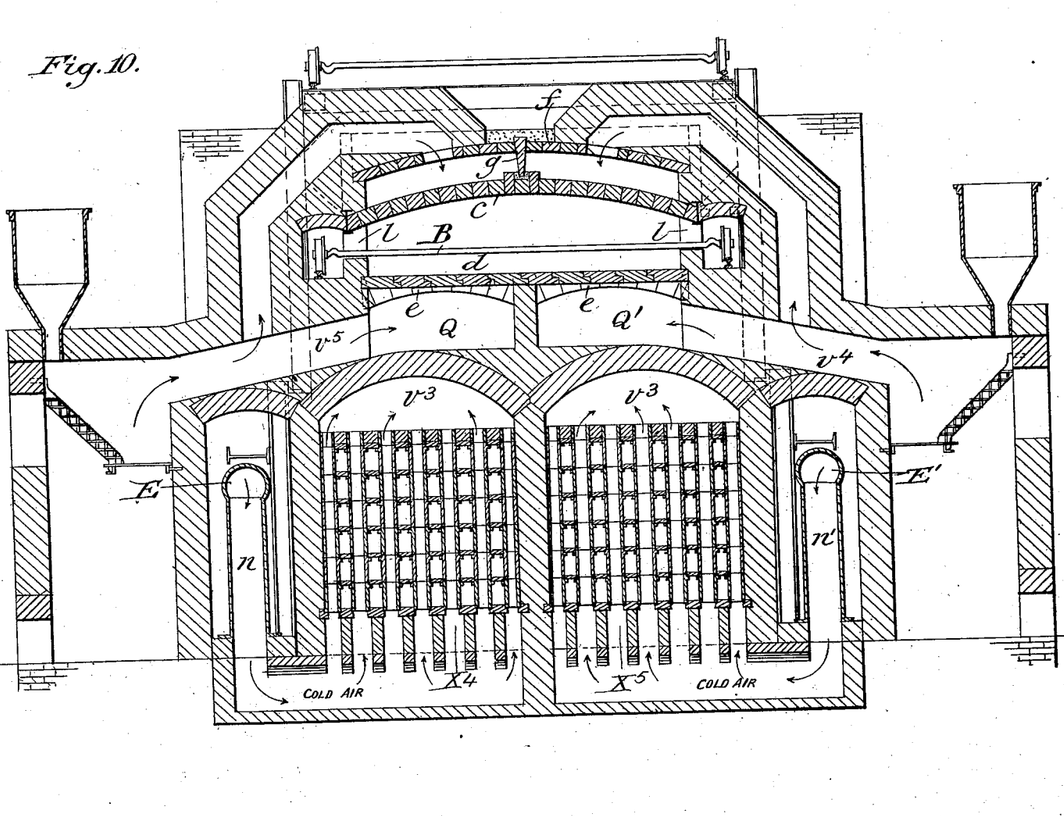
Fig. 10 represents a vertical section on the line 10 10 of Fig. 2.

The heat supplied to the furnace is furnished from a series of gas-producers located symmetrically at suitable distances along the length of the structure and on either side thereof in order to obtain as equal and uniform a distribution of heat as is possible. In harmony with this arrangement the combustion-chambers above and below the roasting-chamber are divided longitudinally by separating-partitions, as shown, so that each side is supplied with products of combustion from the furnaces proximate to it. The combustion-chambers D D' are supplied, respectively, from the gas-producers L L'. This gas instead of passing directly into the combustion-chambers D D' passes first through the preheating-stoves X X', whose purpose and function is to preheat the air to be supplied to the initial portion of the roasting-chamber. The particular construction of the preheating-stoves X X' may be varied within wide limits, although I prefer to employ the construction illustrated in the drawings, wherein the atmospheric air to be heated enters through descending branches $n$ $n'$ of air-supply mains E E' into basal chambers $m$ $m'$ beneath a series of arches which support the superjacent brickwork of the stoves. This brickwork consists of parallel courses of perforated refractory bricks set on end, so that the perforations register with each other and with the openings between the supporting-arches in such manner that a series of flues $s$ $s'$ are formed, through which the air passes upwardly to the chamber $t$. From the chamber $t$ one or more flues $x$ $x'$ enter the initial portion of the roasting-chamber, thereby supplying to the ore therein oxygen in the form best adapted for combining with sulfur—to wit, at a high temperature. Between the parallel courses of air-flues $s$ $s'$ extend parallel courses of horizontal flues $v$ $v'$, located directly above the supporting-arches and formed by tiles $w$, which, as shown, are supported upon projections on the sides of the perforated bricks. The products of combustion from the gas-furnaces pass downward through a downtake-flue $z$ $z'$ and, entering the three lowermost courses of horizontal flues $v$, pass through said courses and thence into and through the three upper courses of flues $v$, from which they enter the combustion-chamber D, where they meet a volume of heated air supplied for the purpose of setting up a secondary combustion. They thence pass from the combustion-chamber D, through other flues, as shown, to the main stack Z. It will of course be understood that a portion of the products of combustion from the gas-producers L L', as hereinbefore described, enters the top combustion-chambers P P' through the flues or passages $p^2$, the quantity thus supplied to the said combustion-chambers being regulated by means of the valves which govern the outlet auxiliary stacks $M^2$ $M^3$. Air for setting up secondary combustion in the said top combustion-chambers is furnished through the ports or passages $p$ $p'$. (See Figs. 3, 5, and 7.) The heating-stove is built in the general structure immediately below the roasting-chamber and, together with the roasting-chamber itself, is secured, tied, and strengthened by vertical buckstays and horizontal I-beams, as shown. The combustion-chambers F F' G G' for the next or intermediate portion of the roasting-chamber are supplied with products of combustion from the pair of gas-producers M M' through the flues $y$ $y'$ and $y^2$ $y^3$. It will be noted that these flues enter the combustion-chambers at their remote ends and pass onward toward the initial portion of the roasting-chamber, at which point they proceed onward toward the main stack Z, as shown. The degree of heat to which the ore is subjected in the intermediate portion of the furnace referred to therefore gradually increases from the beginning to the end of said intermediate portion and for the reason that as the ore in its onward travel is constantly becoming poorer in sulfur a correspondingly gradual increase of external heat is requisite to maintain the temperature necessary to the continued liberation of the sulfur. At some convenient point or points in the intermediate portion of the roasting-chamber the sulfur fumes are continuously taken off—as, for instance, through the flues $a'$ $a^2$—by means of which they are carried to suitable condensing or recovering chambers. In view of the high temperature produced by the combustion of the sulfur in the intermediate portion of the roasting-chamber it is not necessary to supply heated air for secondary combustion in the combustion-chambers F F', and for this reason I dispense with a preheating-stove beneath the intermediate portion of the roasting-chamber, and instead thereof that portion of the roasting-chamber is supported upon columns and I-beams, and in order to prevent radiation of heat the transverse I-beams are spanned by hollow tiles, as shown. The admission of products of combustion to the chambers $g$ $g'$ is regulated by the valves which govern the outlet from the auxiliary stacks $M^4$ $M^5$.

Immediately succeeding the flues of the combustion-chambers F F' G G' are the combustion-chambers H H' J J', which are supplied with products of combustion from the gas-producers N N'. The quantity of the products of combustion furnished to the combustion-chambers J J' is determined by the valves governing the outlets of the auxiliary stacks K K'. The products of combustion entering the combustion-chambers H H' encounter at their entrance thereinto a body of heated air supplied from subjacent preheating-stoves $X^2 X^3$ and pass downwardly through the courses of combustion-flues in said stoves, as indicated by the arrows. The stoves $X^2$ $X^3$ are preferably of the same construction as the stoves X X' and in like manner receive a supply of atmospheric air from the air mains E E', said air passing upwardly through the vertical air-flues to the chamber $v^2$, from which a portion enters the combustion-chambers H H' J J', as described, and from which a further portion passes through a flue $v^3$ into the interior of the roasting-chamber, thereby supplying highly-heated air to the body of ore therein. The preheating-stoves $X^2$ $X^3$ need not extend for the entire length of the combustion-chambers H H'. They may, if desired, be materially shorter, as shown, in which event a portion of the flue of the chamber $v^2$ may be supported by the I-beam and hollow tile flooring $B^3$.

The final portion of the roasting-chamber is provided with means for maintaining therein the highest temperature employed in the roasting-chamber. To this end the preheating-stoves $X^4$ $X^5$ extend beneath the entire length of said final portion of the roasting-chamber and raise the incoming air to a very high temperature. The stoves $X^4$ $X^5$ are preferably of the same construction as the hereinbefore-mentioned preheating-stoves, and the preheated air, after it has entered the chamber $v^3$, is in part supplied through suitable openings or passages $v^4$ $v^5$ to the combustion-chambers Q Q' R R', so as to set up a secondary combustion therein, thereby developing the maximum amount of heat from the gases. A flue $v^6$ furnishes a supply of highly-heated air to the interior of the roasting-chamber, where it is utilized to advantage in connection with the high heat produced in the external combustion-chambers for the final elimination of the last portions of sulfur which the furnace is designed to remove. The combustion-chambers R R' are provided with stacks $K^2$ $K^3$, having valves which control the stack-outlet, and which may be manipulated to regulate the quantity of the products of combustion entering said chambers from the gas-producers.

In case it is desired to remove the fumes weak in sulfur from the last portion of the roasting-chamber, exit-flues $a^3$ $a^4$, similar to the exit-flues $a'$ $a^2$, are provided for that purpose.

While in the drawings I have illustrated my invention as applied to what is known as a "straight-line" furnace, I desire to be distinctly understood as not limiting the invention thereto, and for the obvious reason that whether the furnace be of the straight-line type or the well-known "turret" or "horseshoe" types the same variable temperatures can be maintained in different successive sections of the furnace, and the same variable volumes of heated fresh air may be admitted at the desired points and at the temperatures best adapted to the requirements of the ore in its several stages of desulfurization.

Having thus described my invention, what I claim is—

1. The method of roasting by furnace heat a progressively moving or advancing charge of ore containing sulfur, which consists in excluding therefrom the products of combustion of the heating-furnace, admitting air at an initial portion of the ore and partially oxidizing the sulfur thereby, maintaining the roasting temperature along an advanced portion of the charge by the combustion of the sulfur, withdrawing the sulfur fumes at said advanced portion so as to prevent them from passing on over the remainder of the ore, and finally admitting additional quantities of air to oxidize the sulfur in portions of the charge still further advanced.

2. A roasting-chamber, provided with means for progressively advancing and stirring the furnace charge, said roasting-chamber having a series or succession of external heating-chambers along its length, each of said heating-chambers having its individual source of heat-supply, the central portion of the roasting-chamber being provided with an offtake-flue for sulfur fumes, and the heating-chambers both in rear of and beyond the central portion being connected with air-preheating stoves whose air-flues discharge into the roasting-chamber.

3. A roasting-chamber, provided with means for progressively advancing and stirring the furnace charge, said roasting-chamber having external heating-chambers, and being provided at substantially its central portion with an offtake-flue for sulfur fumes, and hot-air-inlet flues opening into the roasting-chamber both in rear of and beyond its central portion.

4. A roasting-chamber, provided along its length with a series of successive but independent external heating-chambers, each having its individual source of heat-supply, in combination with air-preheating stoves connected with the initial and final members of the series, and air-supply flues leading from the stoves into the interior of the roasting-chamber.

5. A roasting-chamber, provided along its length with a series of successive but independent external heating-chambers, each having its individual source of heat-supply, in combination with air-preheating stoves connected with the initial and final members of the series, and an offtake-flue for sulfur fumes leading from an intermediate portion of the roasting-chamber.

6. A roasting-chamber, provided along its length with a series of successive but independent external heating-chambers, each having its individual source of heat-supply, in combination with air-preheating stoves connected with the initial and final members of the series, an offtake-flue for sulfur fumes leading from an intermediate portion of the roasting-chamber, and air-supply flues leading from the stoves into the initial and final portions of the roasting-chamber.

7. A roasting-chamber, provided with a series of external heating-chambers along its bottom, and a series of auxiliary heating-chambers along its top, said auxiliary chambers having independent draft-controlling valves.

8. A roasting-chamber, provided with a floor consisting of a series of transverse arches spaced apart, the intervals between the arches being spanned by flooring-tiles.

9. A roasting-chamber, provided with a floor consisting of a series of transverse arches spaced apart, the intervals between the arches being spanned by flooring-tiles rabbeted and resting upon shoulders of the arches so that the upper surfaces of the tiles and arches shall be flush with each other.

10. A roasting-chamber, having a source of heat-supply, and provided with a floor consisting of a series of transverse arches, the intervals between the arches being spanned by flooring-tiles resting upon shoulders of the arches so as to form a smooth floor for the roasting-chamber.

11. A roasting-chamber, provided with a vaulted roof, and an upper external heating-chamber having a vaulted roof, the latter roof having its central keystone continued down to form a longitudinal partition in the heating-chamber, and being stepped in a body of sand or the like.

In testimony whereof I affix my signature in presence of two witnesses.

JOHN PRICE WETHERILL.

Witnesses:
C. WETHERILL, Jr.,
GEORGE W. SELTZER.